(12) United States Patent
Takeno et al.

(10) Patent No.: US 10,116,182 B2
(45) Date of Patent: Oct. 30, 2018

(54) ELECTRIC MOTOR STORING DEVICE FOR HYBRID VEHICLE

(71) Applicants: TOYOTA JIDOSHA KABUSHIKI KAISHA, Toyota-shi, Aichi-ken (JP); NIPPON SOKEN, INC., Nishio, Aichi (JP)

(72) Inventors: Motoki Takeno, Toyota (JP); Takuya Kodama, Aichi-gun (JP); Koki Kawamoto, Nisshin (JP); Hiroaki Kiyokami, Nisshin (JP); Ryoji Isarai, Toyoake (JP)

(73) Assignees: TOYOTA JIDOSHA KABUSHIKI KAISHA, Toyota (JP); NIPPON SOKEN, INC., Nishio (JP)

( * ) Notice: Subject to any disclaimer, the term of this patent is extended or adjusted under 35 U.S.C. 154(b) by 179 days.

(21) Appl. No.: 15/050,755

(22) Filed: Feb. 23, 2016

(65) Prior Publication Data
US 2016/0248293 A1 Aug. 25, 2016

(30) Foreign Application Priority Data
Feb. 25, 2015 (JP) ................................ 2015-035918

(51) Int. Cl.
| H02K 5/08 | (2006.01) |
| B60K 6/445 | (2007.10) |
| B60K 6/26 | (2007.10) |
| B60K 6/365 | (2007.10) |
| H02K 5/16 | (2006.01) |

(Continued)

(52) U.S. Cl.
CPC .............. *H02K 5/08* (2013.01); *B60K 6/26* (2013.01); *B60K 6/365* (2013.01); *B60K 6/445* (2013.01); *B60Y 2200/92* (2013.01); *H02K 5/161* (2013.01); *H02K 5/1732* (2013.01); *H02K 7/006* (2013.01); *Y10S 903/906* (2013.01)

(58) Field of Classification Search
CPC ........ H02K 5/08; H02K 5/161; H02K 5/1732; H02K 7/006; B60Y 2200/92; B60K 6/26
See application file for complete search history.

(56) References Cited

U.S. PATENT DOCUMENTS

| 2,706,260 A | * | 4/1955 | Heintz | ................. H02K 9/19 310/216.058 |
| 3,733,503 A | * | 5/1973 | Potter | ................. H02K 9/19 310/54 |

(Continued)

FOREIGN PATENT DOCUMENTS

| CN | 203967881 U | 11/2014 |
| GB | 2 049 301 A | 12/1980 |

(Continued)

*Primary Examiner* — Dang Le
(74) *Attorney, Agent, or Firm* — Oliff PLC

(57) ABSTRACT

An electric motor storing device for a hybrid vehicle, the hybrid vehicle including an electric motor, the electric motor including a rotor shaft and an inner circumferential side rotational shaft disposed on an inner circumferential side of the rotor shaft in a manner to penetrate said rotor shaft, and a case configured to store the electric motor, the electric motor storing device includes: a support member for rotatably supporting the inner circumferential side rotational shaft and the rotor shaft; and an insulating section for insulating between the support member and the case.

7 Claims, 3 Drawing Sheets

(51) Int. Cl.
  *H02K 5/173* (2006.01)
  *H02K 7/00* (2006.01)

(56) References Cited

U.S. PATENT DOCUMENTS

| | | | | |
|---|---|---|---|---|
| 4,528,473 | A * | 7/1985 | Tezuka | G11B 5/5521 |
| | | | | 310/156.64 |
| 4,541,736 | A * | 9/1985 | Giebeler, Jr. | B04B 9/12 |
| | | | | 184/6.18 |
| 5,111,090 | A * | 5/1992 | Otake | H02K 9/19 |
| | | | | 180/229 |
| 6,404,086 | B1 * | 6/2002 | Fukasaku | F16F 1/3873 |
| | | | | 310/156.08 |
| 8,242,646 | B2 * | 8/2012 | Tatematsu | H02K 1/32 |
| | | | | 310/52 |
| 2006/0158049 | A1 * | 7/2006 | Suzuki | H02K 11/33 |
| | | | | 310/52 |
| 2016/0126798 | A1 | 5/2016 | Kawanori et al. | |

FOREIGN PATENT DOCUMENTS

| | | |
|---|---|---|
| JP | S55-139049 A | 10/1980 |
| JP | 2005-033999 A | 2/2005 |
| JP | 2013-085441 A | 5/2013 |
| JP | 2014-111963 A | 6/2014 |
| JP | 2014-145476 A | 8/2014 |
| WO | 2015/001636 A1 | 1/2015 |

\* cited by examiner

ELECTRIC MOTOR STORING DEVICE FOR HYBRID VEHICLE

INCORPORATION BY REFERENCE

The disclosure of Japanese Patent Application No. 2015-035918 filed on Feb. 25, 2015 including the specification, drawings and abstract is incorporated herein by reference in its entirety.

BACKGROUND OF THE INVENTION

1. Field of the Invention

The invention relates to an electric motor storing device for a hybrid vehicle that stores an electric motor, and in particular to a technique for suppressing occurrence of electrolytic corrosion that occurs in a first closed circuit that includes: an inner circumferential side rotational shaft disposed in a manner to penetrate an inner circumferential side of a rotor shaft of the electric motor; and a case, a second closed circuit that includes the rotor shaft of the electric motor and the case, and a third closed circuit that is branched from those closed circuits.

2. Description of Related Art

A hybrid vehicle that includes an electric motor storing device for a hybrid vehicle including: a case for storing an electric motor; a rotor shaft of the electric motor; an inner circumferential side rotational shaft disposed in a manner to penetrate an inner circumferential side of the rotor shaft has been known. One of such an example is an electric motor storing device for a hybrid vehicle in Japanese Patent Application Publication No. 2014-145476 (JP 2014-145476 A). The electric motor storing device for a hybrid vehicle in JP 2014-145476 A is configured by fastening a support member that rotatably supports the rotor shaft to the case.

FIG. 3 is an example of a drive apparatus 112 for a hybrid vehicle that includes a conventional electric motor storing device 110, such as that in JP 2014-145476 A. In this electric motor storing device 110, a rotor shaft 116 of an electric motor 114 is rotatably supported by a bearing 120 that is fixed to a support member 118 and a bearing 124 that is fixed to a case 122. An inner circumferential side rotational shaft 126 that is disposed in a manner to penetrate an inner circumferential side of the rotor shaft 116 is supported by a bearing 128 and a bearing 134 in a manner to be relatively rotatable to the rotor shaft 116, the bearing 128 being disposed between the inner circumferential side rotational shaft 126 and the support member 118, and the bearing 134 being interposed between the rotor shaft 116 and a carrier shaft 132 of a planetary gear device 130 that is spline-fitted to an end of the inner circumferential side rotational shaft 126 on an opposite side from the support member 118. A stator 136 of the electric motor 114 is fixed to the case 122 by a fastening bolt 138. The support member 118 is fastened to an inner wall of the case 122 by a fastening bolt 140.

SUMMARY OF THE INVENTION

When shaft voltages of the rotor shaft 116 and the inner circumferential side rotational shaft 126, each of which is formed of a conductor, are increased along with rotational driving of the electric motor 114, a potential difference is generated between the bearings 120, 124 for supporting the rotor shaft 116 or between the bearings 128, 134 for supporting the inner circumferential side rotational shaft 126, and an induced current is generated therebetween. This induced current possibly flows through a first closed circuit 142 indicated by a dotted line in FIG. 3, a second closed circuit 144 indicated by a one-dot chain line in FIG. 3, and a third closed circuit 146 indicated by a broken line in FIG. 3, the first closed circuit 142 configured by including the inner circumferential side rotational shaft 126, a pump rotor 141, the case 122, a thrust bearing 133, the bearing 134, and the like, the second closed circuit 144 configured by including the rotor shaft 116, the bearing 120, the support member 118, the case 122, the bearing 124, and the like, and the third closed circuit 146 branched from the first closed circuit 142 or the second closed circuit 144 in the case 122 and merged into the first closed circuit 142 or the second closed circuit 144 again via the case 122, an unillustrated bearing, and the like. In this way, electrolytic corrosion, which is a damage by electric discharge, possibly occurs to members such as the bearings in each of the closed circuits, a gear, the inner circumferential side rotational shaft 126, or the like.

In order to prevent such electrolytic corrosion caused by the induced current, it is considered to interpose an insulating layer between the bearing and the support member and/or the case, etc., to suppress establishment of the closed circuits, for example. However, the closed circuit is possibly formed in the case where the insulating layer is defected when the bearing is press-fitted for installation or in the case where the insulating layer is collapsed due to an input force that is applied to the rotor shaft. In addition, such a problem arises that additional spaces are needed in the electric motor storing device for a hybrid vehicle in order to provide the insulating layer for the at least one bearing in each of the closed circuits.

In an electric motor storing device for a hybrid vehicle as described above of the invention, occurrence of electrolytic corrosion to members in a closed circuit including a rotor shaft, a closed circuit including an inner circumferential side rotational shaft, and a closed circuit branched from those closed circuits is thoroughly suppressed by a common insulating section.

An electric motor storing device for a hybrid vehicle according to one aspect of the invention, the hybrid vehicle including an electric motor, the electric motor including a rotor shaft and an inner circumferential side rotational shaft disposed on an inner circumferential side of the rotor shaft in a manner to penetrate said rotor shaft, and a case configured to store the electric motor, the electric motor storing device includes: a support member for rotatably supporting the inner circumferential side rotational shaft and the rotor shaft; and an insulating section for insulating between the support member and the case.

According to the electric motor storing device for a hybrid vehicle according to the one aspect of the invention, the support member for supporting the inner circumferential side rotational shaft and the rotor shaft and the insulating section for insulating between the support member and the case may be provided. Thus, the rotor shaft and the inner circumferential side rotational shaft are insulated against the case by the insulating section for insulating between the support member and the case. In this way, occurrence of electrolytic corrosion to members in a closed circuit including the rotor shaft and the case, a closed circuit including the inner circumferential side rotational shaft and the case, and a closed circuit branched from those closed circuits is thoroughly suppressed by the common insulating section.

The insulating section may be an insulating plate that is interposed between opposing surfaces of the support member and the case. Thus, the rotor shaft and the inner circumferential side rotational shaft, shaft voltages of which are increased, are insulated against the case by the insulating plate that is interposed between the support member and the case. In this way, the occurrence of the electrolytic corrosion to the members in the closed circuit including the rotor shaft and the case, the closed circuit including the inner circumferential side rotational shaft and the case, and the closed circuit branched from those closed circuits is thoroughly suppressed by the common insulating section.

The case and the support member may be fastened by an insulating bolt that does not allow electric conduction between the case and the support member. Accordingly, the support member and the case are fastened while the support member, which is common for the rotor shaft and the inner circumferential side rotational shaft, and the case are insulated from each other.

The support member and the case may be positioned by an insulating pin that does not allow the electric conduction between the case and the support member. Accordingly, the support member and the case are positioned while the support member, which is common for the rotor shaft and the inner circumferential side rotational shaft, and the case are insulated from each other.

The inner circumferential side rotational shaft may be an oil pump drive shaft for transmitting rotation of an engine to a hydraulic pump, and the support member may be a pump body of the hydraulic pump. Accordingly, the rotor shaft and the oil pump drive shaft, the shaft voltages of which are increased, are insulated against the case by the insulating section between the pump body and the case. In this way, the occurrence of the electrolytic corrosion to the members in the closed circuit including the rotor shaft and the case, the closed circuit including the oil pump drive shaft and the case, and the closed circuit branched from those closed circuits is thoroughly suppressed by the common insulating section.

The case may include a cylindrical main case and a cover member for sealing an opening that is an end of the main case, and the insulating section may be provided between the cover member and the support member. Accordingly, the insulating section electrically insulates between the cover member for sealing the opening that is the end on the support member side of the main case and the support member. Thus, even when the case is constructed of plural members that are the main case, the cover member, and the like, the case and the support member are insulated from each other. In this way, the occurrence of the electrolytic corrosion to the members in the closed circuit including the rotor shaft and the case, the closed circuit including the inner circumferential side rotational shaft and the case, and the closed circuit branched from those closed circuits is thoroughly suppressed by the common insulating section.

The case may include a cylindrical main case and a cover member for sealing an opening that is an end of the main case, and the insulating section may be the cover member. Accordingly, the cover member as the insulating section for sealing the opening that is the end on the support member side of the main case is fastened to the support member. Thus, even when the case is constructed of plural members that are the main case, the cover member, and the like, the case and the support member are insulated from each other. In this way, the occurrence of the electrolytic corrosion to the members in the closed circuit including the rotor shaft and the case, the closed circuit including the inner circumferential side rotational shaft and the case, and the closed circuit branched from those closed circuits is thoroughly suppressed by the cover member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on an embodiment of an electric motor storing device for a hybrid vehicle of the invention with reference to the drawings.

Figure 1:
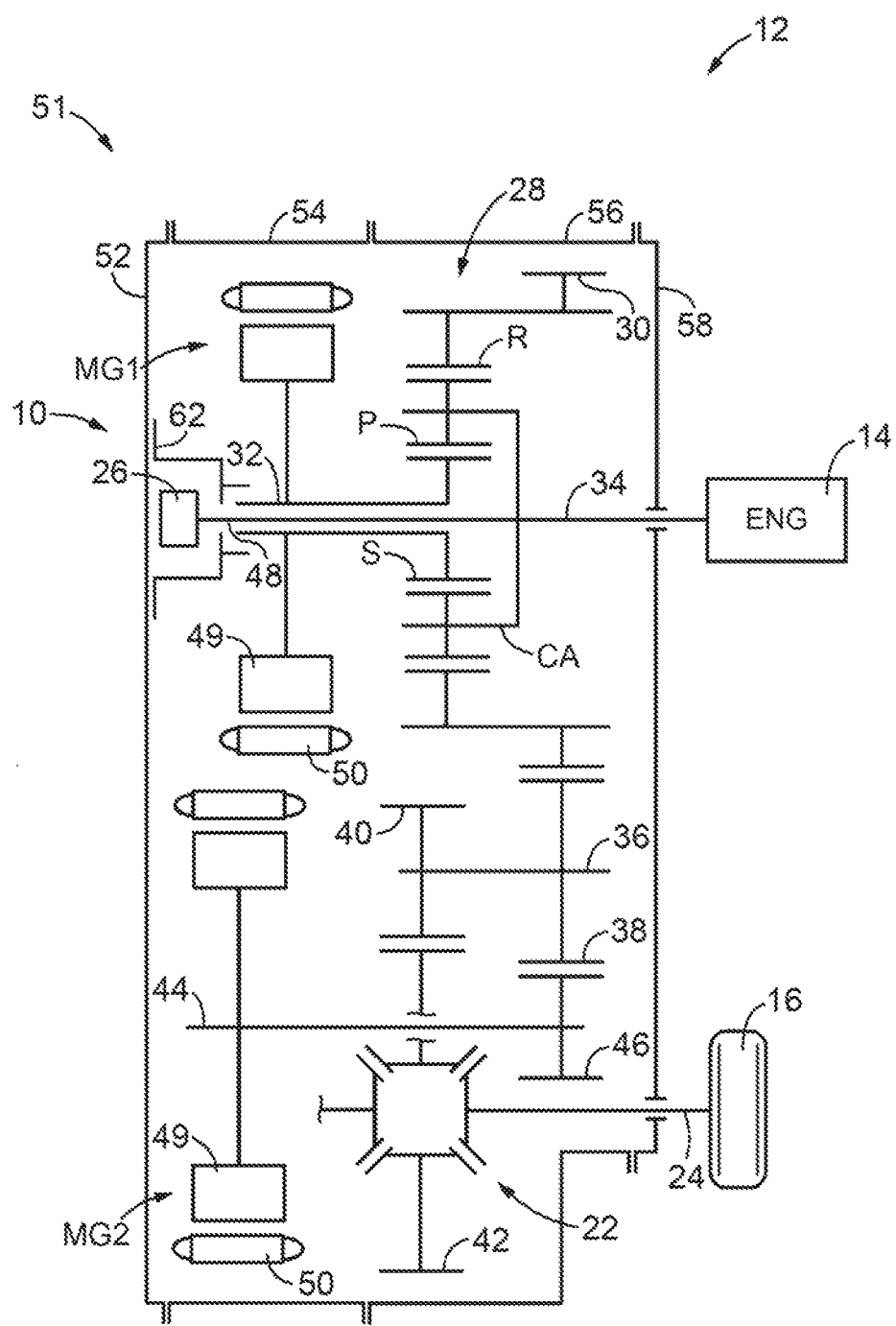
FIG. 1 is a skeletal view for illustrating one example of a schematic configuration of a drive apparatus of a hybrid vehicle that includes an electric motor storing device for a hybrid vehicle.

FIG. 1 is a skeletal view for illustrating one example of a schematic configuration of a drive apparatus of a hybrid vehicle 12 (hereinafter referred to as a "vehicle 12") that includes an electric motor storing device for a hybrid vehicle 10 (hereinafter referred to as an "electric motor storing device 10"). In FIG. 1, the vehicle 12 is configured by including: an engine 14, a first electric motor MG1, and a second electric motor MG2 as drive power sources for travelling; and a planetary gear device 28, a second output gear 46 that is coupled to a second rotor shaft 44 as an output shaft of the second electric motor MG2, a counter shaft 36, a differential gear device 22, a right and left pair of axles 24, and the like that are provided in a power transmission passage between those drive power sources and a right and left pair of drive wheels 16. In addition, the vehicle 12 is provided with an oil pump 26 for generating operating hydraulic pressure that serves as source pressure for a hydraulic control circuit when being rotationally driven by the engine 14 and for supplying lubricating oil to the planetary gear device 28 and the like.

The planetary gear device 28 is a planetary gear device of a single pinion type that has, as three rotation elements (rotation members): a sun gear S as the rotation element that is coupled to a first rotor shaft 32 of the first electric motor MG1; a ring gear R as the rotational element that is coupled to the drive wheels 16 in a manner capable of transmitting power and that meshes with the sun gear S via a pinion gear P; and a carrier CA that supports the pinion gear P in a manner to allow rotation and revolution thereof, and functions as a differential mechanism. The carrier CA is coupled to the engine 14 via an input shaft 34. The ring gear R is a cylindrical member, includes an internal gear that meshes with the pinion gear P, and is formed with an output gear 30 on an outer circumferential surface thereof. In other words, the planetary gear device 28 is a power split mechanism that splits the power output from the engine 14 to the first electric motor MG1 and the output gear 30, and functions as an electric continuously variable transmission gear device. The output gear 30 meshes with a counter driven gear 38 that is provided in an integrated manner with the counter shaft 36, and the counter shaft 36 is parallel with the input shaft 34. A counter drive gear 40 that is provided in an integrated manner with the counter shaft 36 meshes with a differential input gear 42 of the differential gear device 22.

The second output gear 46 meshes with the counter driven gear 38. In this way, the second electric motor MG2 is coupled to the drive wheels 16 in a manner capable of transmitting the power.

The oil pump 26 is coupled to the engine 14 via an oil pump drive shaft 48 and the input shaft 34 and is rotationally driven by the engine 14. The oil pump drive shaft 48 is an inner circumferential side rotational shaft that is coaxially disposed with the first rotor shaft 32 and in a manner to penetrate an inner circumferential side of the first rotor shaft 32.

Each of the first electric motor MG1 and the second electric motor MG2 is constructed of an AC synchronous electric motor that has a rotor 49 having plural permanent magnets and a stator 50 for generating a rotation magnetic field, and is a motor generator that has functions as a motor (the electric motor) for generating the drive power and a generator (a power generator) for generating a reaction force. The first electric motor MG1 at least has the function as the generator, and the second electric motor MG2 at least has the function as the motor.

In the vehicle 12 that is configured as described so far, the power from the engine 14 and the first electric motor MG1 is transmitted to the output gear 30 via the planetary gear device 28 and is transmitted to the differential input gear 42 of the differential gear device 22 via the counter driven gear 38 and the counter drive gear 40 that are provided on the counter shaft 36. Meanwhile, the power from the second electric motor MG2 is transmitted to the counter driven gear 38 via the second rotor shaft 44 and the second output gear 46 and is transmitted to the differential input gear 42 via the counter drive gear 40. In other words, any of the engine 14, the first electric motor MG1, and the second electric motor MG2 is used as a drive power source for traveling in the vehicle 12.

In addition, the vehicle 12 includes a transaxle case 51 that is a non-rotation member for storing the first electric motor MG1, the second electric motor MG2, the planetary gear device 28, the counter shaft 36, the differential gear device 22, and the like, except for the engine 14. The transaxle case 51 is formed of a foundry aluminum material with low aluminum purity, is made of an aluminum alloy, for example, and has high strength. The transaxle case 51 is configured that a rear cover 52, a cylindrical first main case 54, a cylindrical second main case 56, and a front cover 58, which are sequentially disposed from an opposite side of the engine 14, are coupled by a mating surface P1 between the rear cover 52 and the first main case 54, a mating surface P2 between the first main case 54 and the second main case 56, and a mating surface between the second main case 56 and the front cover 58. The rear cover 52 is a component of the transaxle case 51 and functions as a cover member for sealing an opening that is an end on an oil pump body 62 side, which will be described below, of the first main case 54.

Figure 2:
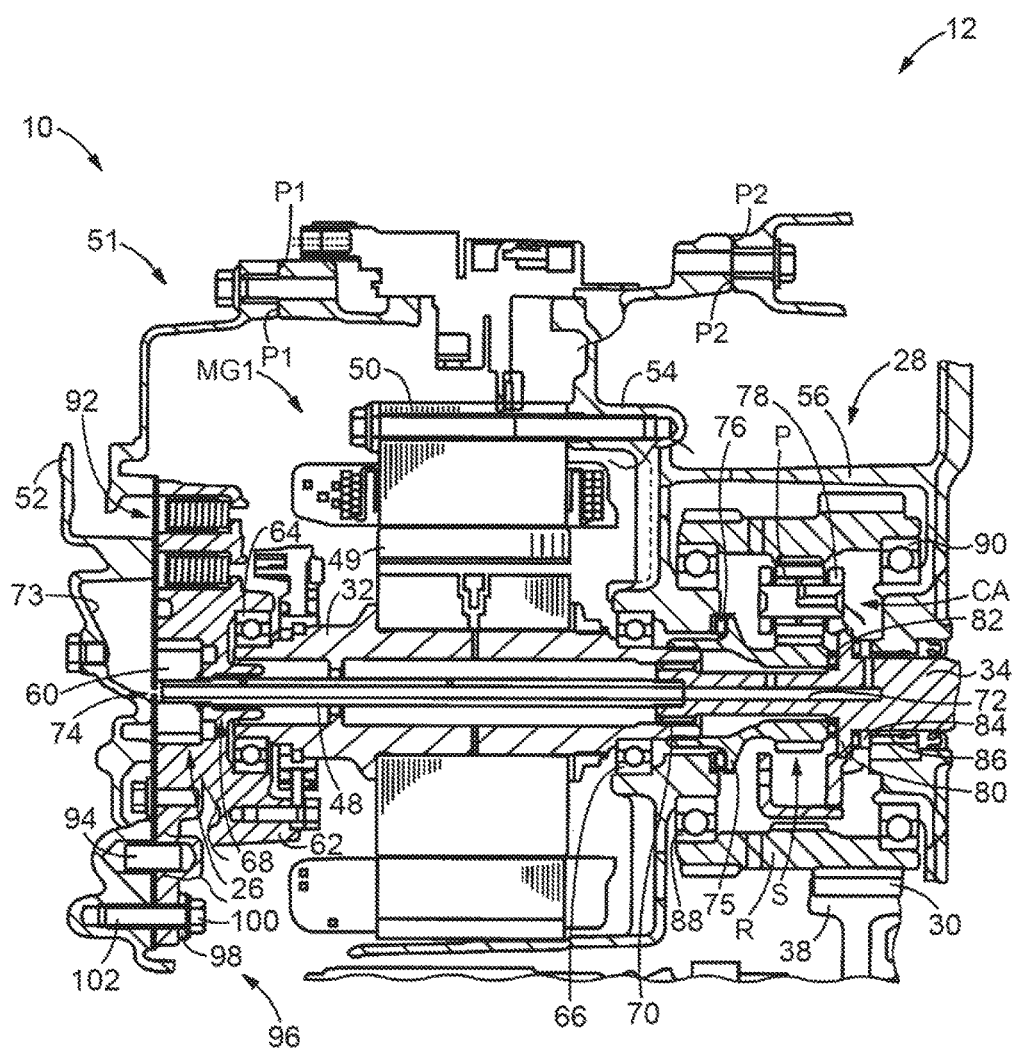
FIG. 2 is a partial cross-sectional view of the drive apparatus that includes the electric motor storing device for a hybrid vehicle in FIG. 1.
Figure 3:
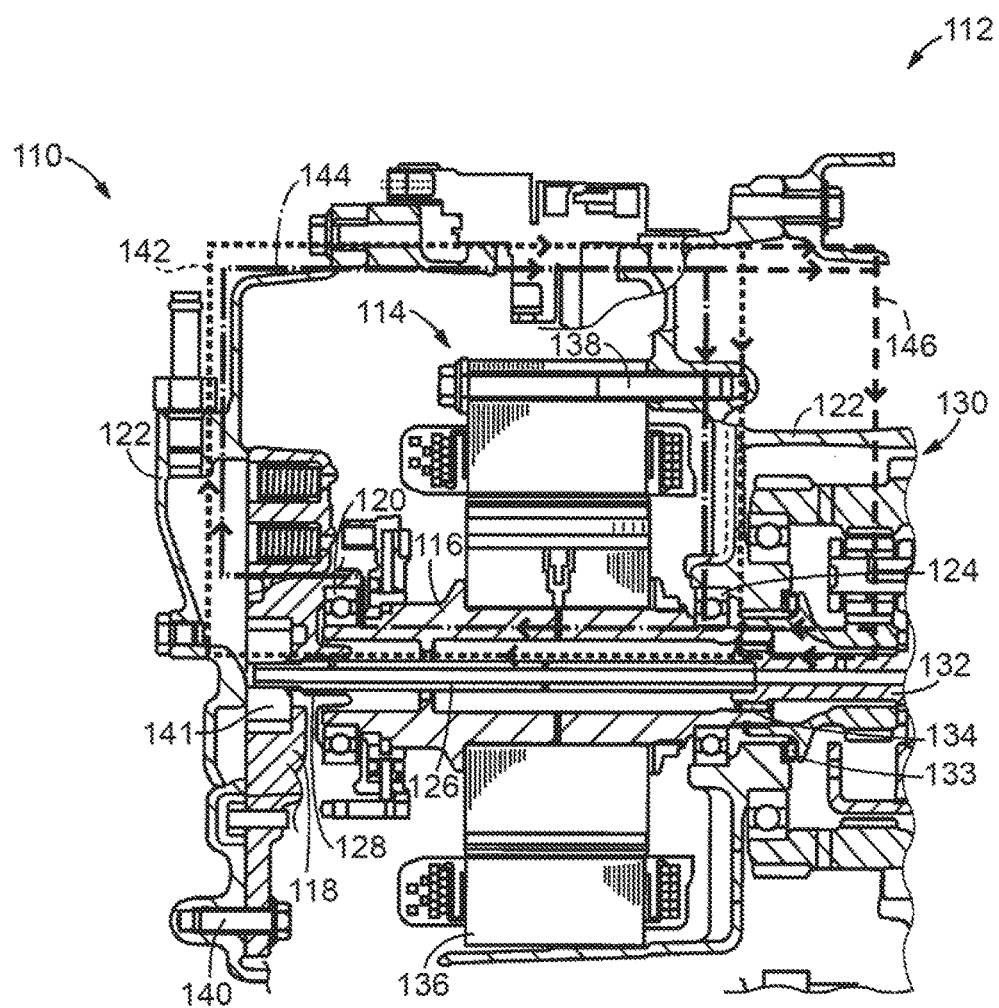
FIG. 3 is a cross-sectional view of an electric motor storing device for a hybrid vehicle that is provided in a conventional hybrid vehicle.

FIG. 2 is a cross-sectional view of a main section of the drive apparatus that includes the electric motor storing device 10. The vehicle 12 has a recess for storing a pump rotor 60 of the oil pump 26 and includes: the oil pump drive shaft 48 for transmitting the power from the engine 14 to the oil pump 26; and the oil pump body 62 that functions as a support member for rotatably supporting the first rotor shaft 32 of the first electric motor MG1. Both ends of the first rotor shaft 32 of the first electric motor MG1 are respectively and rotatably supported by the oil pump body 62 via a first ball bearing 64 and by the first main case 54 via a second ball bearing 66. The end on the second ball bearing 66 side of the first rotor shaft 32 is coupled to the sun gear S that is the rotation element of the planetary gear device 28 by spline-fitting. In the oil pump drive shaft 48 that is coaxially disposed with the first rotor shaft 32 of the first electric motor MG1 in the manner of penetrating the inner circumferential side thereof, an end on the rear cover 52 side thereof is coupled to the pump rotor 60 of the oil pump 26, and an end thereof on an opposite side from the rear cover 52 is coupled to an end of the input shaft 34 on an opposite side from the engine 14. The end on the pump rotor 60 side of the oil pump drive shaft 48 is rotatably supported by the oil pump body 62 via a first needle bearing 68, and an end on the pump rotor 60 side of the input shaft 34, to which the end on the engine 14 side of the oil pump drive shaft 48 is fitted, is supported by the first rotor shaft 32 in a relatively rotatable manner thereto via a second needle bearing 70. The lubricating oil that is discharged from the oil pump 26 driven by the engine 14 is supplied to each of the members, such as the first electric motor MG1 and the planetary gear device 28, in the transaxle case 51 through a shaft center oil passage 72 that is formed on an inner circumferential side of the oil pump drive shaft 48 and radial oil passages that are respectively provided in the oil pump drive shaft 48 and the first rotor shaft 32 in a radial direction. In addition, an insulating gasket 92, which will be described below, has a through hole 74 that communicates between the shaft center oil passage 72 and an oil passage 73 that is constructed between the insulating gasket 92 and the rear cover 52. The lubricating oil that is discharged from the oil pump 26 is also supplied to each of the members in the transaxle case 51 through the oil passage 73.

The sun gear S of the planetary gear device 28 is a cylindrical member, and a first thrust bearing 76 for receiving an axial load is interposed between a flange section 75 that is formed from a cylindrical outer circumferential surface of the sun gear S to an outer circumferential side and the first main case 54. The carrier CA has a pinion shaft for rotatably supporting the pinion gear P and a pair of disc-shaped support walls for supporting both ends of the pinion shaft. Of the paired support walls, a support wall 78 on an opposite side from the first electric motor MG1 is coupled to a wall section 80 that is formed by extending from an outer circumferential surface of the input shaft 34 to an outer circumferential side. A second thrust bearing 82 is interposed between the wall section 80 of the input shaft 34 and an annular end surface of the sun gear S that is on an opposite side from the first electric motor MG1. A third thrust bearing 84 is interposed between the wall section 80 of the input shaft 34 and the second main case 56, a third needle bearing 86 is interposed between the outer circumferential surface of the input shaft 34 and the second main case 56, and the input shaft 34 is rotatably supported by the transaxle case 51 via the third needle bearing 86 and the second needle bearing 70. A third ball bearing 88 is interposed between the first main case 54 and an inner circumferential surface on an end of the ring gear R that is on an opposite side from the output gear 30. A fourth ball bearing 90 is interposed between the second main case 56 and an inner circumferential surface on an end on the output gear 30 side of the ring gear R.

By the way, in the case where shaft voltages of the first rotor shaft 32 and the oil pump drive shaft 48 are increased to become high voltages when the first electric motor MG1 is driven, a second closed circuit that includes the first rotor shaft 32 and the transaxle case 51, a first closed circuit that includes the oil pump drive shaft 48 and the transaxle case 51, and a third closed circuit that is branched from those closed circuits are established, and electrolytic corrosion possibly occurs to the bearings, such as the first ball bearing 64 and the second ball bearing 66, that are interposed in those closed circuits and the oil pump drive shaft 48 itself.

The second closed circuit that includes the first rotor shaft 32 and the transaxle case 51 described above is configured by including the first rotor shaft 32, the first ball bearing 64, the oil pump body 62, the rear cover 52, the first main case 54, the second ball bearing 66, and the like. The first closed circuit that includes the oil pump drive shaft 48 and the transaxle case 51 described above is configured by including the oil pump drive shaft 48, the pump rotor 60, the rear cover 52, the first main case 54, the first thrust bearing 76, the second needle bearing 70, and the like. The third closed circuit that is branched as described above is configured to be branched from the first main case 54 and to be merged into the second closed circuit including the first rotor shaft 32 and the first closed circuit including the oil pump drive shaft 48 from the second main case 56, the third needle bearing 86, and the input shaft 34. Accordingly, it is desired in the vehicle 12 to prevent constitution of the closed circuits, which partially include the transaxle case 51, caused by storage of the first electric motor MG1 and to suppress occurrence of the electrolytic corrosion to the members in the closed circuits.

The electric motor storing device 10 of this embodiment is configured by including: the transaxle case 51 for storing the first electric motor MG1; the oil pump body 62 for rotatably supporting the first rotor shaft 32 of the first electric motor MG1 and the oil pump drive shaft 48 that is disposed on the inner circumferential side of the first rotor shaft 32 in the manner of penetrating the first rotor shaft 32; and the insulating gasket 92 as an insulating section for insulating between the transaxle case 51 and the oil pump body 62. The insulating gasket 92 functions as an insulating plate that is formed of an electric insulating material, such as a synthetic resin film or a synthetic resin composite material, for example, and is interposed between opposing surfaces of the oil pump body 62 and the rear cover 52 that seals the opening on the end on the oil pump body 62 side of the cylindrical first main case 54. The rear cover 52 and the oil pump body 62 are positioned by an insulating pin 94 that does not allow electric conduction between the oil pump body 62 and the transaxle case 51. In a state where the insulating gasket 92 is interposed between the rear cover 52 and the oil pump body 62, one end side of the insulating pin 94, a surface of which is subjected to insulating coating processing by a resin, ceramics, or the like, for example, is fitted into a cylindrical hole of the rear cover 52, and the other end side thereof is press-fitted into a cylindrical hole of the oil pump body 62. The rear cover 52 and the oil pump body 62 are fastened by an insulating bolt 96 that does not allow the electric conduction between the transaxle case 51 and the oil pump body 62. The insulating bolt 96 has an insulating washer 98 that is electrically insulated, and is screwed to a female screw of the rear cover 52 in a state where the insulating washer 98 is interposed between a bolt head 100 and the oil pump body 62 and a cylindrical gap is provided between a bolt shaft section 102 and the oil pump body 62.

As described above, according to the electric motor storing device 10 of this embodiment, the insulating gasket 92 electrically insulates between the oil pump body 62 and the transaxle case 51 that support the oil pump drive shaft 48 and the first rotor shaft 32 together. In this way, the occurrence of the electrolytic corrosion to the members in the second closed circuit including the first rotor shaft 32 and the transaxle case 51, the first closed circuit including the oil pump drive shaft 48 and the transaxle case 51, and the third closed circuit branched from those closed circuits is thoroughly suppressed by the common insulating gasket 92. In addition, due to the above reason, an individual insulating device that is realized by interposing an insulating member between the first ball bearing 64 and the oil pump body 62, for example, becomes unnecessary in each of the closed circuits. Therefore, a space for the electric motor storing device 10 can be saved.

In addition, according to the electric motor storing device 10 of this embodiment, the insulating gasket 92 is interposed between the opposing surfaces of the oil pump body 62 and the rear cover 52. Accordingly, the first rotor shaft 32 and the oil pump drive shaft 48 are insulated with respect to the transaxle case 51 by the insulating gasket 92 that is interposed between the oil pump body 62 and the rear cover 52. In this way, the occurrence of the electrolytic corrosion to the members in the closed circuit including the first rotor shaft 32 and the transaxle case 51, the closed circuit including the oil pump drive shaft 48 and the transaxle case 51, and the closed circuit branched from those closed circuits is thoroughly suppressed by the common insulating gasket 92.

Furthermore, according to the electric motor storing device 10 of this embodiment, the insulating washer 98 is interposed between the oil pump body 62 and the bolt head 100, and the cylindrical gap is provided between the bolt shaft section 102 and the oil pump body 62. In this way, the rear cover 52 and the oil pump body 62 are fastened by the insulating bolt 96 that does not allow the electric conduction between the transaxle case 51 and the oil pump body 62. Accordingly, the oil pump body 62 for supporting both of the first rotor shaft 32 and the oil pump drive shaft 48 is fastened to the rear cover 52 while being insulated against the transaxle case 51.

Moreover, according to the electric motor storing device 10 of this embodiment, the oil pump body 62 and the rear cover 52 are positioned by the insulating pin 94. The one end side of the insulating pin 94, which is formed with an insulating coating, is fitted into the rear cover 52, and the other end side thereof is press-fitted into the oil pump body 62. In this way, the insulating pin 94 does not allow the electric conduction between the transaxle case 51 and the oil pump body 62. Accordingly, the oil pump body 62 for supporting both of the first rotor shaft 32 and the oil pump drive shaft 48 is positioned with respect to the rear cover 52 while being insulated against the transaxle case 51.

The transaxle case 51 preferably includes the cylindrical first main case 54 and the rear cover 52 for sealing the opening that is the end on the oil pump body 62 side of the first main case 54, and the insulating gasket 92 is preferably provided between the rear cover 52 and the oil pump body 62. In this way, the rear cover 52, which seals the opening as the end on the oil pump body 62 side of the first main case 54, and the oil pump body 62, which is fastened to the rear cover 52, are electrically insulated from each other by the insulating gasket 92. Accordingly, even when the transaxle case 51 is constructed of the plural members, which are the rear cover 52, the first main case 54, the second main case 56, and the front cover 58, the transaxle case 51 and the oil pump body 62 are insulated from each other. Thus, the occurrence of the electrolytic corrosion to the members in the closed circuit including the first rotor shaft 32 and the transaxle case 51, the closed circuit including the oil pump drive shaft 48 and the transaxle case 51, and the closed circuit branched from those closed circuits is thoroughly suppressed by the common insulating gasket 92.

The invention has been described in detail so far with reference to the drawings. However, the invention can be implemented by further another aspect, and various modifications can be made thereto within a scope that does not depart from the gist of the invention.

For example, according to the electric motor storing device 10 of the above-described embodiment, as the insulating section for electrically insulating between the oil pump body 62 and the transaxle case 51, the insulating gasket 92, which is a different body from the oil pump body 62 or the rear cover 52, is interposed between the opposing surfaces of the oil pump body 62 and the rear cover 52. However, the invention is not limited thereto. For example, an insulating layer that is formed of a resin coating, a ceramic coating, or the like is provided on at least one of mating surfaces of the oil pump body 62 and the rear cover 52 and is provided as the insulating section that is integrated with the oil pump body 62 or the rear cover 52. Then, the oil pump body 62 and the rear cover 52 are fastened by the insulating bolt 96. Also, in such a case, the above insulating layer insulates between the transaxle case 51 and the oil pump body 62 for supporting both of the first rotor shaft 32 and the oil pump drive shaft 48. In addition, the above insulating layer is formed on either one of the mating surfaces of the oil pump body 62 and the rear cover 52, and a recess and a projection that are fitted to each other are respectively provided on the above mating surfaces. Then, the oil pump body 62 and the rear cover 52 are fastened by press-fitting the projection into the recess. Also, in such a case, the oil pump body 62 and the transaxle case 51 are insulated from each other.

According to the insulating bolt 96 of the electric motor storing device 10 of the above-described embodiment, the insulating washer 98 is interposed between the bolt head 100 and the oil pump body 62. However, the invention is not limited thereto. For example, an insulating coating, such as the resin coating or the ceramic coating, is formed on a seating surface on the oil pump body side of the bolt itself, and the cylindrical gap is provided between the bolt shaft section 102 and the oil pump body 62. Also, in such a case, the oil pump body 62 and the rear cover 52 are fastened while the oil pump body 62 and the transaxle case 51 are insulated from each other. In addition, the insulating bolt 96 may be a fastening bolt that is formed of aluminum with high purity, that is subjected to anodizing processing, and a surface of which is thereby formed with a thin anodized film.

According to the insulating pin 94 of the electric motor storing device 10 of the above-described embodiment, the one end thereof has the surface subjected to the insulating coating processing by the resin, the ceramics, or the like and is fitted into the cylindrical hole of the rear cover 52, and the other end thereof is press-fitted into the cylindrical hole of the oil pump body 62. However, the invention is not limited thereto. For example, it may be configured that the one end side, which is subjected to the insulating coating processing, is fitted into the oil pump body 62 and the other end side is press-fitted into the rear cover 52, that either the one end side or the other end side is fitted into an insulating collar that is press-fitted into the rear cover 52 or the oil pump body 62 and is electrically insulated, or that the one end side and the other end side are formed of the resin or the ceramics and thus are electrically insulated. In any of the above cases, the oil pump body 62 and the rear cover 52 are positioned while the oil pump body 62 and the transaxle case 51 are insulated from each other.

According to the electric motor storing device 10 of the above-described embodiment, the transaxle case 51 for storing the first electric motor MG1 is made of the aluminum alloy with the high strength. However, the invention is not limited thereto. The rear cover 52, which is a member for constituting the transaxle case 51 and seals the opening at the end on the oil pump body 62 side of the first main case 54, itself may be formed of a resin material that is electrically insulated and has high strength, such as amide fiber reinforced plastic (AFRP) or glass fiber reinforced plastic (GFRP), and may be fastened to the oil pump body 62 for supporting both of the first rotor shaft 32 and the oil pump drive shaft 48. In summary, the rear cover 52 itself functions as the insulating section. Thus, even when the transaxle case 51 is constructed of the plural members, which are the rear cover 52, the first main case 54, the second main case 56, and the front cover 58, the transaxle case 51 and the oil pump body 62 are insulated from each other.

According to the electric motor storing device 10 of the above-described embodiment, the oil pump body 62 for rotatably supporting both of the first rotor shaft 32 of the first electric motor MG1 and the oil pump drive shaft 48, which is disposed on the inner circumferential side of the first rotor shaft 32 in the manner of penetrating the first rotor shaft 32, is provided. However, the invention is not limited thereto. For example, even when the insulating section is interposed between two each of the first rotor shaft 32, a support member that is not the oil pump body 62 and supports a rotational shaft other than the oil pump drive shaft 48 on the inner circumferential side of the first rotor shaft 32, and the rear cover 52, the transaxle case 51 and the above support member are insulated from each other. In this way, the occurrence of the electrolytic corrosion to the members in the plural closed circuits that includes the closed circuit including the first rotor shaft 32 and the transaxle case 51 can thoroughly be suppressed by the above insulating section. In summary, the support member for supporting both of the first rotor shaft 32, the shaft voltage of which is increased by driving of the first electric motor MG1 and the inner circumferential side rotational shaft of the first rotor shaft 32, and the transaxle case 51 as a conductor only have to be insulated from each other.

It should be noted that what has been described above is merely one embodiment. Although the invention will not be exemplified in other embodiments, the invention can be implemented in aspects, to which various modifications and improvements are made on the basis of knowledge of those skilled in the art, without departing from the gist of the invention.

What is claimed is:

1. An electric motor storing device for a hybrid vehicle, the hybrid vehicle including
    an electric motor, the electric motor including a rotor shaft and an inner circumferential side rotational shaft disposed on an inner circumferential side of the rotor shaft in a manner to penetrate the rotor shaft, and
    a case configured to store the electric motor, the electric motor storing device comprising:
    a support member configured to rotatably support the inner circumferential side rotational shaft and the rotor shaft, the support member being fixed to the case; and
    an insulating section configured to electrically insulate between the support member and the case to which the support is fixed.

2. The electric motor storing device according to claim 1 wherein
    the insulating section is an insulating plate that is interposed between opposing surfaces of the support member and the case.

3. The electric motor storing device according to claim 2 wherein the case and the support member are fastened by an insulating bolt that does not allow electric conduction between the case and the support member.

4. The electric motor storing device according to claim 2 wherein
the support member and the case are positioned by an insulating pin that does not allow the electric conduction between the case and the support member.

5. The electric motor storing device according to claim 1 wherein
the inner circumferential side rotational shaft is an oil pump drive shaft, and the support member is an oil pump body.

6. The electric motor storing device according to claim 1 wherein
the case includes a cylindrical main case and a cover member for sealing an opening that is an end of the main case, and
the insulating section is provided between the cover member and the support member.

7. The electric motor storing device according to claim 1 wherein
the case includes a cylindrical main case and a cover member for sealing an opening that is an end of the main case, and
the insulating section is the cover member.

* * * * *